United States Patent [19]

Engelhardt

[11] Patent Number: 4,925,290
[45] Date of Patent: May 15, 1990

[54] ADJUSTABLE SPECTACLE FRAME

[75] Inventor: David R. Engelhardt, Edwardstown, Australia

[73] Assignee: R. Engelhardt Nominees Pty. Ltd., Australia

[21] Appl. No.: 331,015

[22] Filed: Mar. 29, 1989

Related U.S. Application Data

[63] Continuation of Ser. No. 198,660, May 23, 1988, abandoned, which is a continuation of Ser. No. 756,973, filed as PCT AU84/00153 on Aug. 8, 1984, published as WO85/00900 on Feb. 28, 1985, abandoned.

[30] Foreign Application Priority Data

Aug. 8, 1983 [AU] Australia .................................. 0713

[51] Int. Cl.⁵ .............................................. G02C 7/06
[52] U.S. Cl. ........................................ 351/55; 351/128
[58] Field of Search ..................... 351/55, 57, 58, 59, 351/60, 128, 136, 137

[56] References Cited

U.S. PATENT DOCUMENTS 2,685,819  8/1954  Page ......................................... 351/55
2,842,029  7/1958  Roth ......................................... 351/57
4,113,365  9/1978  Koketsu .................................. 351/128
4,542,965  9/1985  Shedrow ................................. 351/128

Primary Examiner—P. M. Dzierzynski

[57] ABSTRACT

A spectalce frame (10) comprises three assemblies; a lens frame assembly (11), a nose piece assembly (12) and an accessory (13), the lens frame assembly comprising a pair of lens frames connected by a frame bridge (24), the accessory comprising an accessory frame (14) which includes an accessory bridge (16), and the nose piece assembly having mounting means (18) thereon which includes a hinge carried by the bridge (21) of the nose piece assembly, which hinge supports the accessory bridge so that the accessory can be in the line of vision or retracted upwardly therefrom, the mounting means also comprising engagement means (22) which can releasably engage the lens frame (23), so that the lens frame can be snapped into or out of position on the nose piece assembly.

11 Claims, 4 Drawing Sheets

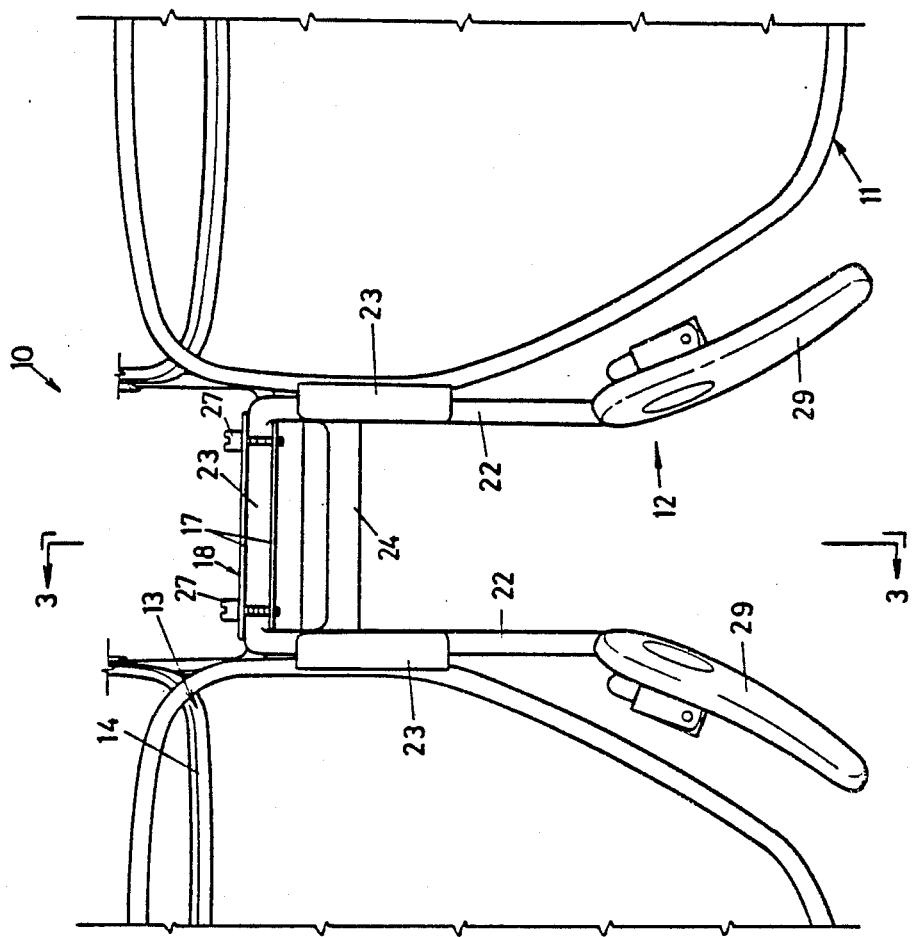
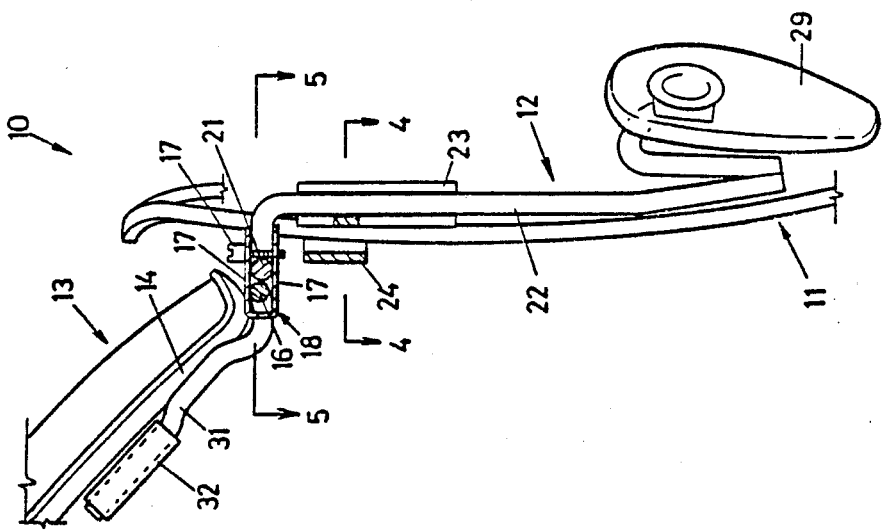

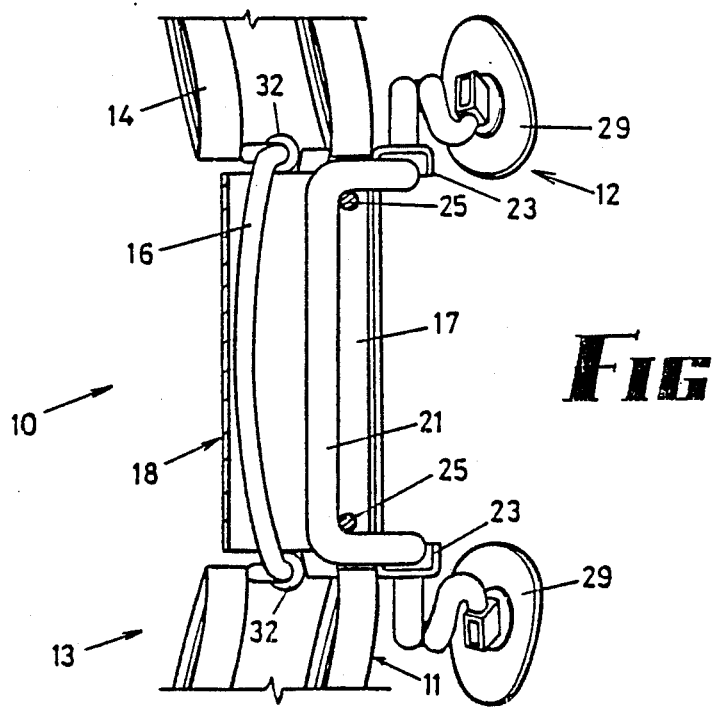

ADJUSTABLE SPECTACLE FRAME

This is a continuation of co-pending application Serial No. 07/198,660 filed on May 23, 1988 which is a continuation of Serial No. 756,973 filed as PCT AU84/00153 on Aug. 8, 1984, published as WO85/00900 on Feb. 28, 1985 and both now abandoned.

This invention relates to an adjustable spectacle frame having an accessory, and includes improvements in the adjustable spectacle frame described in our Australian Patent Application No. 16351/83, based on the provisional specification PF 4901.

BACKGROUND OF THE INVENTION

In the specification which accompanied that application, there was claimed an adjustable spectacle frame having a lens frame assembly and a nose piece assembly, the lens frame assembly comprising a pair of lens frames, a frame bridge connecting the lens frames, and a pair of parallel guides depending from the frame bridge, each being of general "U" shape in cross-section.

The nose piece assembly was described as comprising a slide having a pair of parallel slide legs joined at their upper ends by a slide bridge, the slide legs being in slidable engagement with the concave surfaces of respective guides with sufficient friction to retain relative positions of the slides and guides, a pair of downwardly directed nose pad supports extending upwardly from the lower ends of the slides, and nose pads releasably retained by the supports. This arrangement made it possible to raise or lower the spectacle frame with respect to the nose pads, this being particularly convenient for persons who wanted to vary the elevation of their line of sight.

PRIOR ART STATEMENT

The closest prior art known to the applicant is British Specification 492569 (Bausch & Lomb). Other relevant art may be found in British Specifications 427831, 509979; U.S. No. 2184147; Japanese Specifications 56-34885, 59-13606, 50-157250, 55-147016, 53986, 5643769, and Australian Specification 67067/81, some of which relate to height adjustment means, but none of which comprises an accessory carried by a nose piece assembly, to which can be readily attached, or detached, a lens frame assembly of a pair of spectacles.

This invention is directed to improvements whereby accessories will be readily usable without damaging a pair of spectacles. For example, heretofore when a sunglasses accessory is used in conjunction with a pair of spectacles, it frequently clips to the spectacle frame or the lens adjacent the frame, and the clips inflict damage on the frame, the lens or both. The same can be said for lenses giving increased magnification, as for example may be worn by a watch-maker or a surgeon.

The main object of this invention is to provide improvements whereby accessories can be utilised in conjunction with a lens frame assembly.

BRIEF SUMMARY OF THE INVENTION

Briefly in this invention a spectacle frame comprises three assemblies; a lens frame assembly, a nose piece assembly and an accessory, the lens frame assembly comprising a pair of lens frames connected by a frame bridge, the accessory comprising an accessory frame which includes an accessory bridge, and the nose piece assembly having mounting means thereon which includes a hinge carried by the bridge of the nose piece assembly, which hinge supports the accessory bridge so that the accessory can be in the line of vision or retraced upwardly therefrom, the mounting means also comprising engagement means which can releasably engage the lens frame, so that the lens frame can be snapped into or out of position on the nose piece assembly.

With this arrangement the nose piece assembly can selectively engage different lens frame assemblies, and in some instances engage alternative accessories, while in other instances each accessory can itself include a nose piece assembly. If the releasable lens frame engagement means on the nose piece assembly embodies a channel section guide and the lens frame assembly is engaged by spaced slide legs depending from the nose piece bridge, the accessory together with its nose piece assembly can be quickly and easily snapped into position or released from engagement with the "U" section guides of the lens frame assembly. This provides a very convenient and very effective means whereby an accessory can be attached to a lens frame assembly or replaced with another accessory without danger of damage to the lens frame assembly, and further embodies the facility to vary the position of the lens frame assembly with respect to the nose piece assembly.

More specifically, in this embodiment a spectacle frame comprises a lens frame assembly, a nose piece assembly, and an accessory, said lens frame assembly comprising a pair of lens frames, and a frame bridge connecting the lens frames, said accessory having an accessory frame which includes an accessory bridge, a bridge on the nose piece assembly, and mounting means on the nose piece assembly, said mounting means comprising hinge means carried by the bridge of the nose piece assembly which hingedly supports the accessory bridge, said mounting means also comprising releasable lens frame engagement means which engages the lens frame and releasably supports the lens frame.

BRIEF SUMMARY OF THE DRAWINGS

Embodiments of the invention are described hereunder in some detail with reference to and are illustrated in the accompanying drawings in which:

FIG. 2 is an enlarged fragmentary rear elevation of the assembly of FIG. 1 when the accessory is engaged with the spectacle frame, FIG. 3 is a fragmentary section taken on line 3—3 of FIG. 2, FIG. 4 is a fragmentary section taken on line 4—4 of FIG. 3, when the sunglasses frame is in its in-use position, FIG. 5 is a fragmentary section taken on line 5—5 of FIG. 3, also showing the sunglasses frame in its in-use position.

Figure 1:
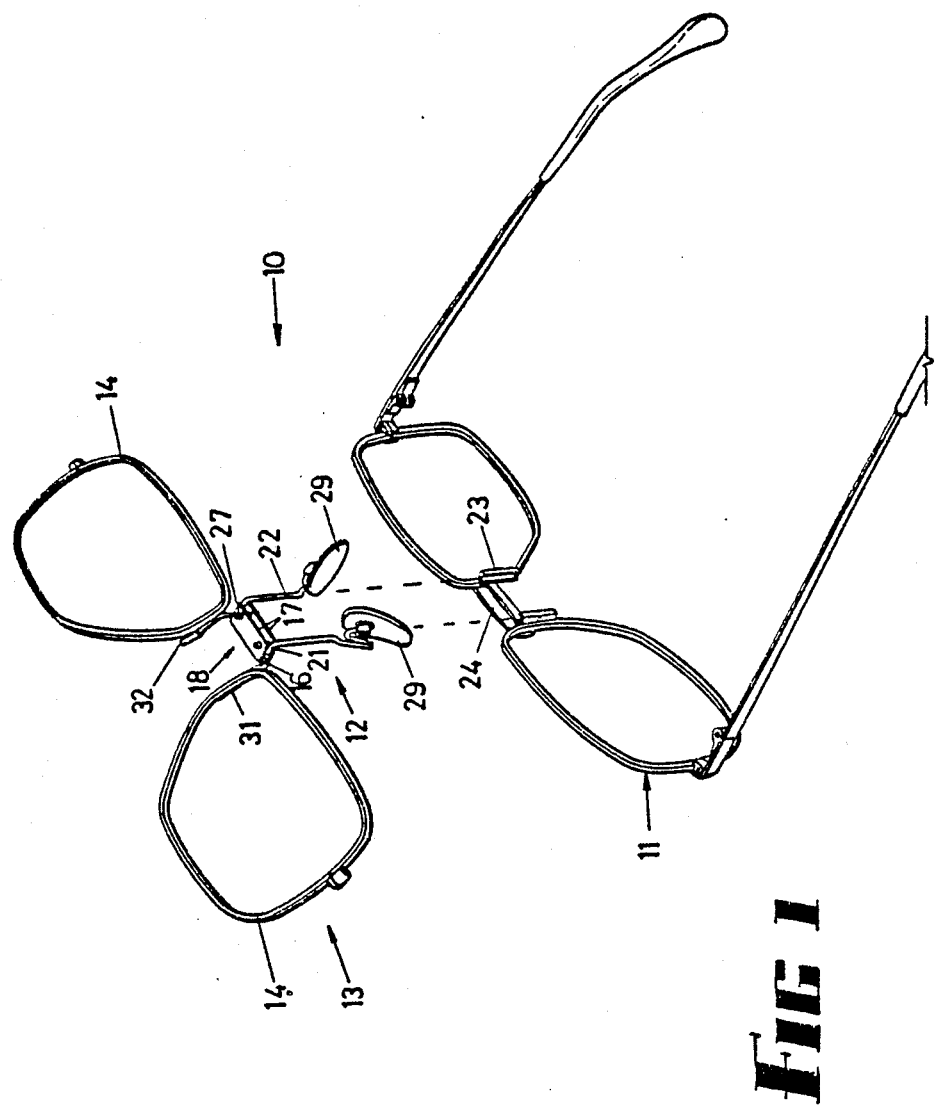
FIG. 1 is an "exploded" view of a spectacle frame showing a lens frame assembly, nose piece assembly, and an accessory frame which is useful as a sunglasses frame.

Referring first to the embodiment illustrated in FIGS. 1 through to 5, a spectacle frame 10 comprises a lens frame assembly 11, the nose piece assembly 12, and an accessory 13. In this embodiment the accessory 13 comprises a pair of lens frames 14 which are arranged to contain sunglasses lenses (not herein shown). The accessory 13 is provided with a bridge 16 which is shaped in plan as illustrated in FIG. 5, and is contained between the flanges 17 or a "U" section mounting channel 18, the bridge 16 being slightly curved so that it resiliently deforms when the accessory lens frames 14 are moved from an in-use position where their lenses will intercept a wearer's view, to an upper or retracted position as illustrated in FIGS. 1, 2 and 3. This formation enables the accessory 13 to be "snapped" downwardly into its end view position or upwardly into its retracted position.

The nose piece assembly 12 comprises a bridge 21 (FIG. 5) from which depend a pair of slide legs 22, and as shown in FIG. 4, the slide legs 22 slidably engage in "U" section channel guides 23 which depend from a lens frame bridge 24 of lens frame assembly 11. Each "U" section channel guide 23 comprises a lining 26 (FIG. 4) which is of polymeric material and thereby avoids build up of metal dust which might otherwise interfere with a smooth but frictional movement between the slide legs 22 and channel guide 23.

The mounting channel 18 is provided with a pair of lock screws 27 which, as best seen if FIG. 5, retain the nose piece bridge 21 in position between the flanges 17. Thus the mounting channel 18 becomes portion of the nose bridge assembly 12 for this embodiment, and also comprises hinge means for the hinging movement of the accessory 13 with respect thereto, and thereby with respect to spectacle frame 10. The lower ends of the slide legs 22 carry nose pads 29 thereon. It might be noted that it is desirable to avoid the slide legs 22 beig too soft, and in this embodiment the upper ends of the slide legs 22 are tempered to be softer than the legs themselves so that the slide legs 22 do not themselves deflect excessively when engaged in channel guides 23. One suitable material for the slide legs 22 is beryllium copper.

When the accessory 13 snaps down to the in-use position, to avoid marking of the lens frame assembly 11, projecting bars 31 are provided which have on them sleeves 32 of soft thermoplastic material as seen best in FIG. 3.

In this embodiment the slide legs 22 are longer than the guides 23 so that relative movement of the lens frame assembly 11 with respect to the nose pad assembly 12 is achieved if it is desired to deflect the line of vision of a user.

It will be seen, especially from FIGS. 3 and 5, that lens frame bridge 24 connects the lens frames of lens frame assembly 11 so that they lie in a generally vertical first plane (perpendicular to the sheet of FIG. 3 and of FIG. 5), while channel guides 23 lie in a generally vertical second plane (also perpendicular to the sheet of FIG. 3 and of FIG. 5) located behind or rearwardly of that first plane in a direction relatively toward the nose of the wearer, in use. Correspondingly, slide legs 22 are located above nose pads 29 and below nose piece bridge 21 and lie in a generally vertical third or adjustment plane (likewise perpendicular to the sheet of FIG. 3 and of FIG. 5) in such manner that slide legs 22 are spaced from the nose when nose pads 29 are seated on the nose (cf. FIG. 2).

Thus, when lens frame assembly 11 is mounted via channel guides 23 on accessory slide legs 22, the second plane of channel guides 23 coincides generally with the adjustment plane of slide legs 22, and that adjustment plane is therefore correspondingly located behind or rearwardly of the first plane of the frame bridge connected lens frames of lens frame assembly 11, i.e. in that direction relatively toward the nose of the wearer, and lens frame bridge 24 is below nose piece bridge 21 (cf. FIG. 2), whereby lens frame assembly 11 is in spaced relation to the nose in any position of its vertical movement relative to the accessory when the latter is worn on the nose, and thus independent movement of lens frame assembly 11 is permitted to occur in interference-free or unhindered relation to the nose.

Figure 6:
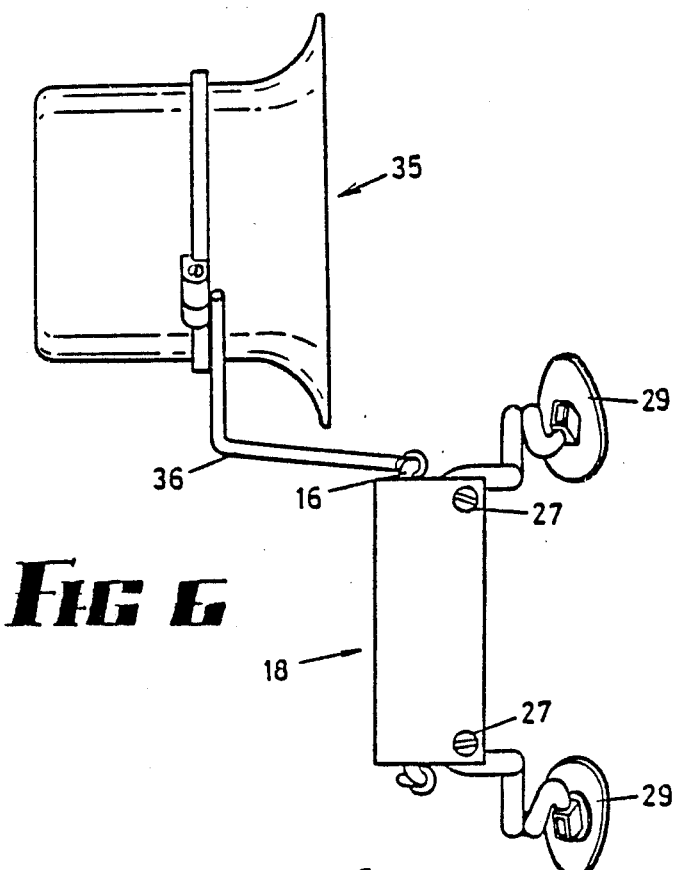
FIG. 6 is a plan view of a nose piece assembly and accessory wherein the accessory comprises an eyeglass having magnifying powers such as might be used by a jeweller, and, FIG. 7 is a central section through a nose piece assembly and an accessory wherein the accessory is a prism which might be used by a paraplegic wishing to view an object placed below (or above) his head.

The above embodiment was described with respect to an accessory comprising, or adapted to comprise sunglass lenses. However other accessories can be used and in FIG. 6 a similar arrangement exists excepting that the accessory designated 35 is an eyeglass containing a lens (not shown) and is suitable for use by a jeweller. It is connected to the bridge 16 by means of an arm 36, but in other respects it is substantially the same as in the first embodiment and the similar elements bear similar designation numbers.

Figure 7:
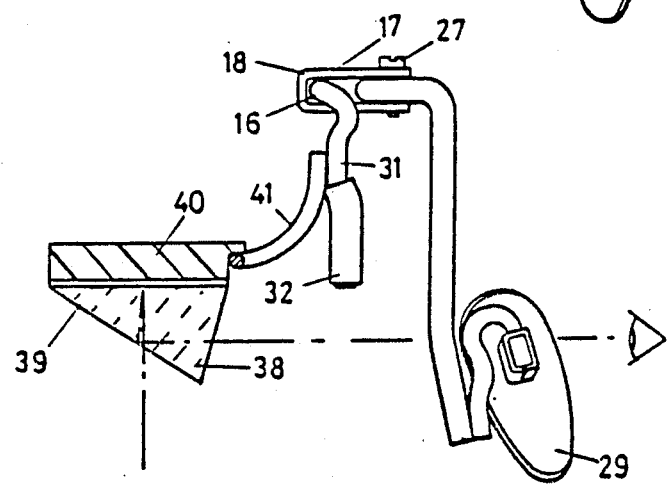

Sometimes it is required that a paraplegic view an object (for example, a book) through a prism and the embodiment of FIG. 7 illustrates such a prism 38 having a mirrored surface 39 thereon, and carried by a frame 40 connected by arm 41 to an accessory bridge 16 located between the flanges 17 of the mounting channel 18. Use. is made of the bars 31 and sleeves 32 as in the first embodiment.

The claims defining the invention are as follows:

1. A spectacle frame comprising a lens frame assembly, a separate nose-piece assembly, and an accessory,
   the lens frame assembly comprising a pair of lens frames, a frame bridge connecting the lens frames, and a pair of laterally spaced generally vertical guide means,
   the nose-piece assembly having a nose-piece bridge, and mounting means carried by the nose-piece bridge for supporting thereon the accessory for movement of the latter with respect to the nose-piece assembly between an in-use position and a retracted position, the nose-piece assembly also comprising a pair of laterally spaced generally vertical slide legs depending from the nose-piece bridge, each with a respective nose pad at its lower end, for stationary seating of said nose-piece assembly on the nose of the wearer,
   said pair of legs being received in said pair of guide means, respectively, for supporting the lens frame assembly on the nose-piece assembly for independent, generally vertical, sliding movement of said movable frame assembly relative to the stationary nose-piece assembly and accessory,
   whereby adjustment of the vertical position of the movable lens frame assembly with respect to said stationary nose-piece assembly may be accomplished without interfering with the predetermined in-use position of said accessory with respect to the eyes of the user so that said accessory will be automatically returned to that same position relative to the eyes of the user whenever said accessory is moved from the retracted to the in-use position thereof irrespective of the vertical adjustment position of said lens frame assembly.

2. Frame of claim 1 wherein the mounting means comprise hinge means supporting the accessory for hinged movement between said in-use and retracted positions.

3. Frame of claim 2 wherein the accessory has an accessory frame which includes an accessory bridge, and the mounting means comprises a separate channel shaped mounting member having a pair of shaped flanges, and means securing the nose-piece bridge between the flanges, the accessory bridge extending between and being rotatable between the flanges thereby to comprise the hinge means, and further being of curved shape and of sufficient resiliency so that it deforms resiliently when the accessory is hingedly moved between said positions and thereby moves by snap action directly from one such position to the other such position.

4. Frame of claim 3 wherein the nose-piece bridge extends between said flanges adjacent the accessory bridge, and the means securing the nose-piece bridge between the flanges is a removable attachment means interconnecting the flanges, thereby permitting exchangeable mounting of a different accessory or nose-piece assembly in the mounting member.

5. Frame of claim 3 wherein the accessory includes projection means provided with soft material thereon and arranged such that when the accessory is moved by snap action to the in-use position, the soft material of the projection means will contact the lens frame assembly, thereby protecting the lens frame assembly from damage thereto by such snap action movement of the accessory.

6. Frame of claim 1 wherein the accessory comprises a sunglasses lens frame.

7. Frame of claim 1 wherein the accessory comprises en eyeglass.

8. Frame of claim 1 wherein the accessory comprises a prism.

9. Frame of claim 1 wherein said guide means comprise a pair of channel shaped guides and said slide legs comprise springy legs adapted to be snapped into and out of the channel shaped guides for releasably supporting the lens frame assembly in the nose-piece assembly for said sliding movement of the lens frame assembly relative to the nose-piece assembly and accessory.

10. Frame of claim 9 further comprising a lining of polymeric material in each channel shaped guide the inner walls of which are frictionally engaged by said legs when inserted into said guides, said legs being longer than said guides thereby providing height adjustment means for the lens frame assembly.

11. Frame of claim 9 wherein said legs and nose-piece bridge consist of a single length of wire, and the upper end portions of said legs are tempered to be softer than the remaining lower portions thereof to control the relative deflection of said legs in said guides.

* * * * *